UNITED STATES PATENT OFFICE.

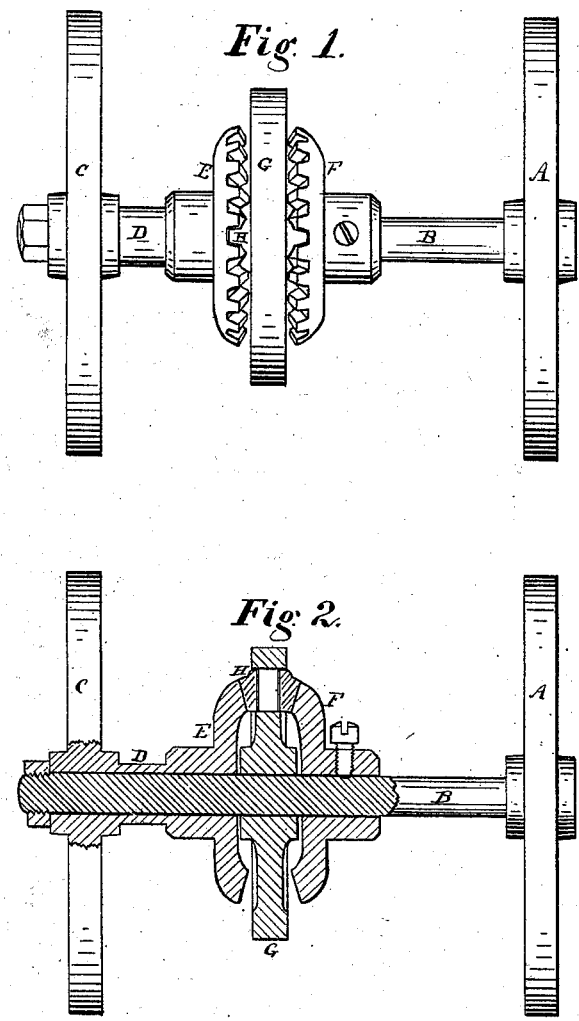

REUBEN GATES, OF CLEVELAND, OHIO.

IMPROVEMENT IN AXLES FOR VEHICLES.

Specification forming part of Letters Patent No. 150,411, dated May 5, 1874; application filed March 20, 1874.

*To all whom it may concern:*

Be it known that I, REUBEN GATES, of Cleveland, in the county of Cuyahoga and State of Ohio, have invented a new Axle, of which the following is a specification:

This invention relates to a new construction of a geared axle in such a manner that both wheels on said axle may run together or independently, or each in the opposite direction, and is designed for use in reaping and mowing machines, as both wheels by this construction are employed to dispense power. The axle may also be used on street-cars, as in turning curves the wheels readily adapt their motion to the curvature of tracks.

The invention consists in placing one wheel, A, rigidly on one end of the axle B, and placing the other wheel C on a sleeve, D, on the other end of said axle said sleeve having a bevel-gear wheel, E, attached, there being also a similar bevel-gear wheel, F, rigidly attached to the axle, and between said bevel-wheels interposing a third wheel, G, turning on the axle, and having at one side a bevel-pinion, H, set in an opening made through the wheel G, so that it will mesh with both gears E F.

In the accompanying drawing, Figure 1 is a side elevation of my invention, and Fig. 2 is a longitudinal section.

B, Figs. 1 and 2, is a straight round axle-bar, of the usual form, to which is permanently attached a wheel, A. C is a similar wheel fixed to a sleeve, D, placed on the axle B, to which is attached a bevel-gear wheel, E. The wheel C with the sleeve D and gear E all turn on said axle. A gear-wheel, F, like in form to gear-wheel E, is securely bolted to the shaft B a short distance from the wheel E, and facing it. Between the said wheels E F is placed a wheel, G, which turns on the axle. In a space made for it, near the circumference, is placed a pinion, H, turning on a pivot in said space, and meshing with both wheels E F. Other pinions like this may be placed at intervals in said wheel G, if desired, to give more strength and steadiness.

With this arrangement for an axle, power may be derived from both wheels A and C for reaping and mowing machines, the said wheel G being employed to transmit said power, and at the same time the machine is capable of turning curves freely. This axle is also adapted to street-cars. The wheels A and C, when the machine or car is moving straight forward, turn just alike, and on curves readily adapt themselves thereto, the said wheel G in this case being used as a brake-wheel, and acts alike on both wheels A C.

Having described my invention, I claim—

The geared axle composed of wheel A, rigidly fixed to axle B, and the wheel C affixed to a sleeve, D, having a toothed wheel, E, cast therewith, in combination with the toothed wheel F, secured to axle B, and wheel G, having pinion H, all constructed to operate as specified.

REUBEN GATES.

Witnesses:
GEO. W. TIBBITTS,
A. W. LAMSON.